(No Model.)
C. S. MAULDIN.
STALK CHOPPER AND COTTON THINNER.
No. 459,640. Patented Sept. 15, 1891.
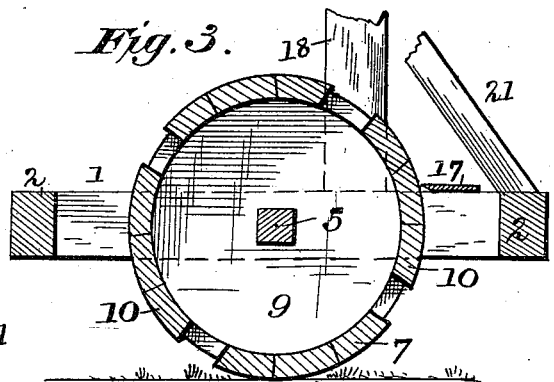
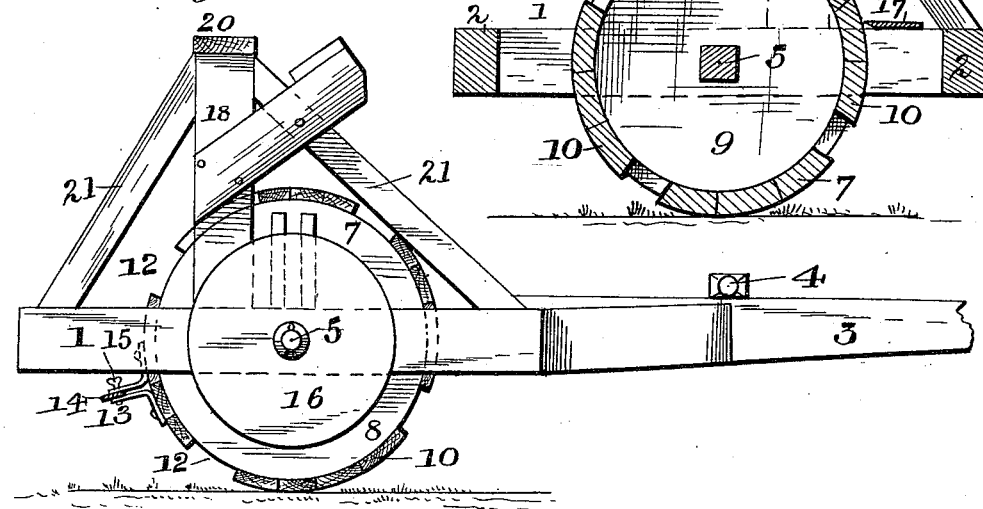
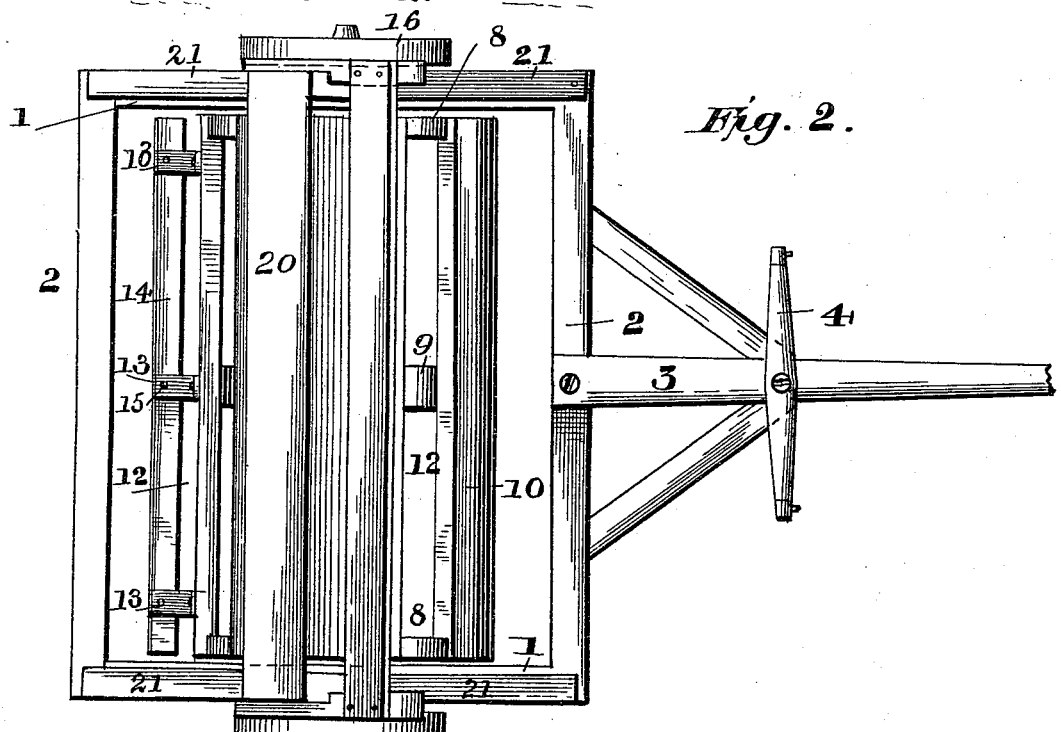
WITNESSES:
F. L. Ourand
W. L. Coombs
INVENTOR:
Columbus S. Mauldin
by Siggers & Siggers & Co.
Attorneys

UNITED STATES PATENT OFFICE.

COLUMBUS SCOTT MAULDIN, OF HINCKLEY, TEXAS.

STALK-CHOPPER AND COTTON-THINNER.

SPECIFICATION forming part of Letters Patent No. 459,640, dated September 15, 1891.

Application filed April 29, 1891. Serial No. 390,956. (No model.)

*To all whom it may concern:*

Be it known that I, COLUMBUS SCOTT MAULDIN, a citizen of the United States, and a resident of Hinckley, in the county of Hunt and State of Texas, have invented certain new and useful Improvements in Stalk-Cutters and Cotton-Thinners; and I do hereby declare that the following is a full, clear, and exact description of the invention, which will enable others skilled in the art to which it appertains to make and use the same, reference being had to the accompanying drawings, which form a part of this specification.

My invention relates to improvements in cotton choppers and thinners, the object being to provide a simple and economical construction of apparatus in which certain of the parts are made removable and replaceable, so as to use the apparatus either as a stalk-chopper or a cotton-thinner, or may be changed to a dropper, as may be desired.

The invention consists in the novel construction and combination of parts hereinafter fully described, and specifically pointed out in the claim.

In the accompanying drawings, Figure 1 is side elevation of an apparatus constructed in accordance with my invention. Fig. 2 is a central longitudinal section of the same. Fig. 3 is a plan view.

In the said drawings the working parts are supported by a rectangular frame consisting of the side pieces 1 and front and rear cross-bars 2. To the front cross-bar is secured the tongue 3, having a whiffletree 4.

Journaled in the side bars 1 is a shaft 5, which carries a drum 7, consisting of end disks 8 and one or more intermediate disks 9. These disks are connected by means of transverse staves or bars 10, removably secured to the peripheries of said disks, with a series of spaces 12 between said staves. Secured to one or more of these staves is a series of brackets 13, having apertures in their ends which register with corresponding apertures in knives or cutters 14, which are embraced between said brackets and removably secured thereto by means of set-screws 15. The shaft 5, intermediate of its ends, is made square or angular and passes through corresponding apertures in the disks, so that said disks and shaft will rotate together. The outer ends of the shaft are made cylindrical, forming spindles to receive wheels 16, which may be of any ordinary construction. In rear of the drums is a transverse scraper-blade 17, secured to the side bars and serves the purpose of cleaning the drum of any dirt which might otherwise accumulate thereon.

The numeral 18 designates uprights secured to the side bars, connected at their upper ends by means of a transverse board or plank 20, which serves as a seat for the driver. These uprights are braced by means of diagonal bars 21, secured to the front and rear of the side bars 1.

The operation is as follows: When used as a cotton-stalk chopper, the machine is drawn over the field, when the drum will be rotated and the cutting-blades will engage with and cut the stalks. To use the machine as a thinner, the wheels and blades are removed, so that the drum will rest directly upon the ground, acting as a roller, the staves or solid portions thereof crushing out the growing plants in the rows, the plants which it is desired to leave standing projecting up in the spaces between the staves, so that the roller will pass over the same without injuring them. The roller or drum also packs the ground around the stand and crushes and pulverizes the clods. The staves are made removable, so that the size of the spaces and the distance apart can be regulated as circumstances may require. By means of holes around the drum and near each end the operation of dropping is carried on, two plows being attached to a cross-bar just in front of the drum for the purpose of laying off the ground; also, four plows are attached to a cross-bar just behind the drum for the purpose of covering the seed.

Having thus described my invention, what I claim is—

The herein-described cotton chopper and thinner, comprising the rectangular frame, the tongue, the shaft journaled in the frame, the drums consisting of the disks and removable staves connecting the same with intermediate spaces, the removable cutting-knives attached to the staves, the removable wheels, the scraper-blade, the uprights and diagonal braces, and the seat, all constructed and operating substantially as set forth.

In testimony that I claim the foregoing as my own I have hereunto affixed my signature in presence of two witnesses.

COLUMBUS SCOTT MAULDIN.

Witnesses:
H. H. WOOD,
D. C. MAULDIN.